Dec. 22, 1970

L. A. DE ROSA 3,550,155

PRINTER USING A SOLID STATE SEMICONDUCTOR MATERIAL AS A SWITCH

Filed Jan. 18, 1968

INVENTOR

LOUIS A. DE ROSA

BY

ATTORNEY

United States Patent Office 3,550,155

Patented Dec. 22, 1970

3,550,155

PRINTER USING A SOLID STATE SEMICONDUCTOR MATERIAL AS A SWITCH

Louis A. de Rosa, Bryn Mawr, Pa., assignor to International Telephone and Telegraph Corporation, Nutley, N.J., a corporation of Delaware Filed Jan. 18, 1968, Ser. No. 698,843
Int. Cl. G01d 15/06, 15/14
U.S. Cl. 346—74 3 Claims

ABSTRACT OF THE DISCLOSURE

A printer is provided which comprises a solid state semiconductor material which operates as a switching device to control a character mosaic in response to laser beam excitation. The switching device has a characteristic that once it has been switched from one condition to another condition it is retained in that condition until it is again instantaneously excited.

BACKGROUND OF THE INVENTION

In general this invention relates to a printing device utilizing a solid state control device which operates as a switching device, and more particularly it is related to a printing arrangement using a laser beam to control the switching of a symmetrical current controlling device which is described in Pat. No. 3,271,591 issued Sept. 6, 1966, and identified in this application as "Ovshinsky material."

The solid state current controlling or switching device which is described in the above-identified patent, is a semi-conductor material which in one state or condition, offers high resistance and is substantially an insulator for blocking the flow of current therethrough in either or both directions and, in another state or condition, is of low resistance and substantially a conductor for conducting the flow of current therethrough in either or both directions. These characteristics can be effectively use to provide a printer utilizing laser beam optics to control the switching of the device to the conductive state by pinpointing of the beam on the precise device to be switched.

SUMMARY OF THE INVENTION

It is therefore an object of this invention to provide a printer utilizing laser beam control for exciting a solid state switching device.

Another object of this invention is to use a switching device which is identified as "Ovshinsky material" and which is response to a laser beam switches from a high resistance state to a low resistance state.

According to the broader aspects of the invention there is provided a printer comprising a solid state current controlling device which operates as the switching device and is known as "Ovshinsky material," a character mosaic responsive to said switching device, a source of bias potential for the switching device and the mosaic, means for switching said switching device, and printing means which, upon excitation of said mosaic, causes the associated character to be printed.

A feature of this invention is that the "Ovshinsky material" together with the character mosaic may be formed as a printing drum having a writing position, a printing position, and an erase position. At the writing position, a laser beam causes switching of the "Ovshinsky material" with the following excitation of a particular character mosaic which is to be printed at the printing position. The excitation of the mosaic will then cause printing on a chargeable paper because of the memory characteristics of the "Ovshinsky material," an erase position is provided to prepare the drum for the writing position. The drum has attached to its suitable potentials for the biasing of the "Ovshinsky material" and mosaic so that continual printing on chargeable paper at the print position is possible.

BRIEF DESCRIPTION OF THE DRAWINGS

The invention will be more clearly understood when the following description is taken in conjunction with the drawings in which.

DESCRIPTION OF THE PREFERRED EMBODIMENTS

Figure 1:
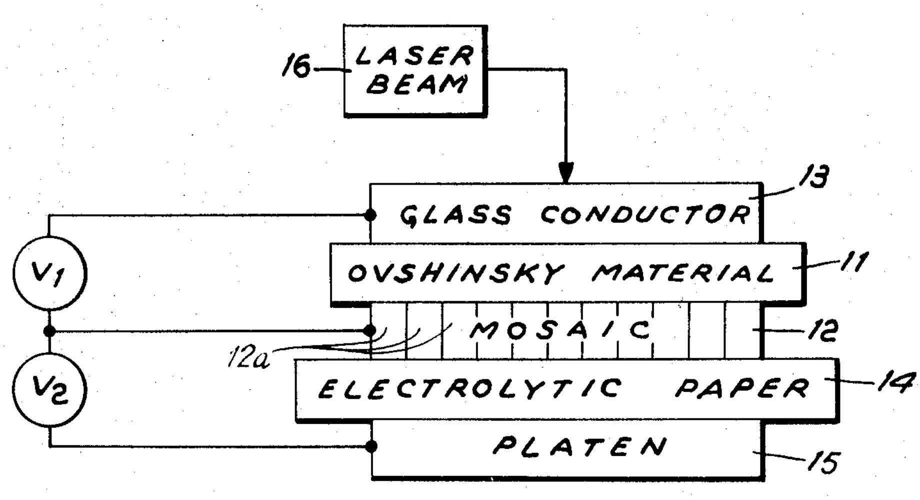
FIG. 1 illustrate the principle of printing according to the invention.

Referring now to FIG. 1, there is shown the "Ovshinsky material" 11 together with a character mosaic 12 which are located between a glass conductor 13, electrolytic paper 14 and platen 15. The mosaic 12 as used herein is intended to mean any single or multiple of dots, squares or other geometric pattern which is caused to conduct in response to the switching of material 11 to form the character. A laser beam source 16 switches the "Ovshinsky material" so as to change its characteristics, in the manner described in the above patent, from a high resistive state to a low resistive state, this causes an associated character mosaic portion 12*a* to conduct in response to the writing of laser beam 16 and place a charge on electrolytic paper 14 in a known manner. The voltage sources of V1 and V2 supply the bias potential for the "Ovshinsky material" and mosaic which potential without the switching is not sufficient to cause printing. The printing will only occur in response to the laser beam impinging through glass conductor 13 onto the "Ovshinsky material," and at the point of impingement is it able to switch from a high resistive state to a low resistive state. The particular point which has switched from a high resistive state to a low resistive state permits the current to flow from source V1 through that point in the "Ovshinsky material" to the mosaic and back to the source potential. This enables the electrolytic paper 14 to charge and reproduce the format by its contact to the character mosaic and the grounded return path of platen 15 to voltage source V2.

As shown in FIG. 1, this arrangement is flat and the laser beam is arranged to transverse across the linear surface in a normal left to right fashion inscribing the desired result on the electrolytic paper 14 as a permanent copy. The laser beam is easily controllable according to known optical methods so that it can pinpoint its converging beam on the precise location required.

Figure 2:
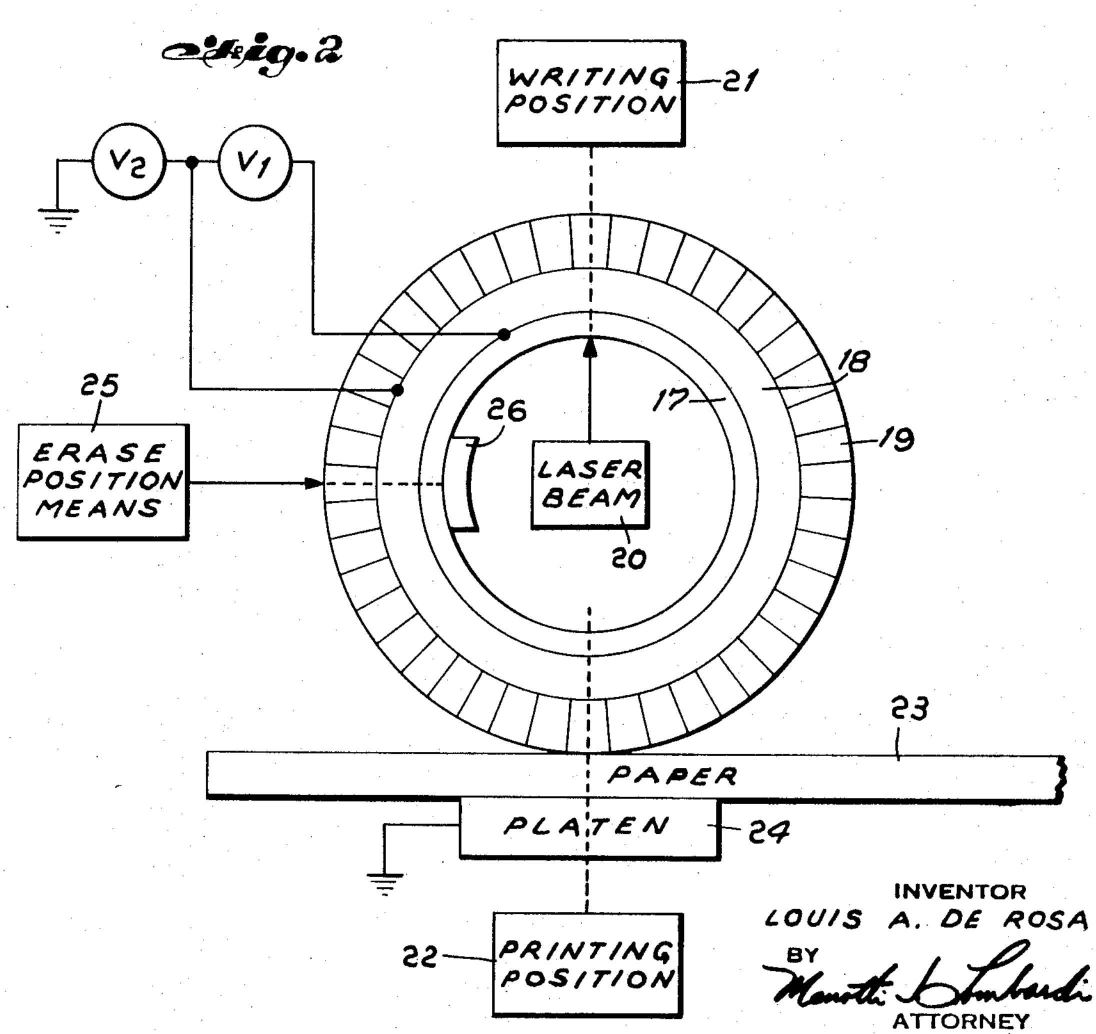
FIG. 2 illustrates the arrangement of FIG. 1 in a printing drum configuration.

Referring now additionally to FIG. 2, there is shown a typical drum type writing arrangement in which the writing takes place on one side of the drum and the printing takes place at some point on the periphery of the drum. According to the invention I have proposed a printing drum having an inside circumference comprised of a glass conductor 17 which surrounded by the "Ovshinsky material" 18 and an outer circumference comprised of a character mosaic 19. A laser beam source 20 movable in a direction into and out of the paper and the drum's length may be of any convenient dimension as required for a copy. Contacting the "Ovshinsky material" 18 and the mosaic 19 are sources of potential V1 and V2 for setting the bias on the material and the mosaic as described above.

The writing position 21 is where the "Ovshinsky material" is switched to cause the mosaic to conduct the "Ovshinsky material" will then remain switched, and at printing position 22 there is further included electrolytic paper 23 and grounded platen 24.

Due to the voltage sources V1 and V2 the mosaic will conduct and cause a character to be imprinted on paper 23 at the printing position 22. The "Ovshinsky material" remains switched until it reaches an erase position means 25, which together with the backed up device 26, forms a complete circuit to cause electrical switching of the "Ovshinsky material" from the low resistive state to the high resistive state, the material remains in this condition until it is again switched in response to laser beam 20 in the writing position 21.

It is evident in the printing arrangement shown in FIG. 2 that the laser beam in response to suitable pulse commands can traverse the length of a symmetrical drum so as to selectively excite the "Ovshinsky material" 18 which is sandwiched between a glass conductor 17 and a mosaic 19. Once the material has been switched from a high resistive condition to a low resistive condition, the current is allowed to flow from the voltage sources V1, V2 so that the conducting mosaic at the printing position 22 will cause the formation of the character on electrolytic paper 23. The support and grounded platen 24 also acts as a return path for the potential voltage sources. The material will remain in its switch condition until it reaches erase position 25, which may include a high potential source, wherein the switching of the "Ovshinsky material" takes place as it passes the erase position to return it to a high resistive condition so that no current will flow. The voltage may be applied to the printing drum by slip rings in a known manner.

While I have described above the basis of my invention in connection with specific apparatus, other forms thereof may become apparent to those skilled in the art by reference to this disclosure and accordingly, this invention is to be limited only by the accompanying claims.

I claim:

1. A printer arrangement comprising:
- a solid state current controlling device having a high and low resistive state and operating as a switching device;
- a glass conductor connected on one side of said device;
- a character mosaic connected to the other side of said device;
- a first source of bias potential coupled between said conductor and mosaic;
- means for switching said switching device from one state to another to cause an associated portion of said character mosaic to conduct;

- printing means including electrolytic paper and a platen, said electrolytic paper being sandwiched between said character mosaic and said platen; and
- a second source of potential coupled between said mosaic and platen, whereby said electrolytic paper is charged according to the conduction of said associated portion.

2. A printer according to claim 1 wherein said means for switching said switching device is a laser beam which impinges on said glass conductor to cause the connected impinged portion of said switching device to switch from a high resistive condition to a low resistive condition.

3. A printing arrangement comprising:
- a glass conductor formed in the shape of a printing drum;
- a solid state layer of switchable material formed around the circumference of said glass conductor;
- a character mosaic surrounding said switchable material and forming the outer surface of said drum;
- means for selectively switching said material from a high resistive to a low resistive condition, said means including
  - a laser beam situated within said drum to impinge on said glass conductor and cause the switching of said material;
  - a first source of potential connected between said conductor and mosaic;
  - means for printing including electrolytic paper and a platen located in a printing position; and
  - a second source of potential coupled between said mosaic and platen, whereby said paper is charged according to the selective switching of said material from a high to a low resistive condition.

References Cited

UNITED STATES PATENTS

| | | | |
|---|---|---|---|
| 2,939,029 | 5/1960 | Wahlig | 340—174.1X |
| 3,205,301 | 9/1965 | Etcheverry | 340—173X |
| 3,271,591 | 9/1966 | Ovshinsky | 340—173X |
| 3,317,316 | 5/1967 | Bean et al. | 346—74X |
| 3,397,404 | 8/1968 | Highleyman | 346—74 |
| 3,439,174 | 4/1969 | Snaper | 346—74X |

STANLEY M. URYNOWICZ, Jr., Primary Examiner

G. M. HOFFMAN, Assistant Examiner